United States Patent [19]

Niitsuma et al.

[11] Patent Number: 5,119,207
[45] Date of Patent: Jun. 2, 1992

[54] COPIER WITH IMAGE TRANSFER REGION DETERMINATION AND SELECTIVE SAMPLING OF IMAGE DATA THEREOF

[75] Inventors: Tetsuya Niitsuma; Koji Washio; Kazuyoshi Tanaka; Takashi Hasebe; Seiichiro Hiratsuka, all of Hachioji, Japan

[73] Assignee: Konica Corporation, Tokyo, Japan

[21] Appl. No.: 645,050

[22] Filed: Jan. 24, 1991

[30] Foreign Application Priority Data

Feb. 5, 1990 [JP] Japan .................................... 2-25783

[51] Int. Cl.⁵ ...................... H04N 1/23; H04N 1/387; H04N 1/393
[52] U.S. Cl. .................................. 358/296; 358/401; 358/449; 358/451; 358/453; 358/462
[58] Field of Search ............... 358/296, 300, 302, 406, 358/449, 451, 453, 462, 467, 443

[56] References Cited

U.S. PATENT DOCUMENTS

| | | | |
|---|---|---|---|
| 4,694,352 | 9/1987 | Ina | 358/451 |
| 4,730,219 | 3/1988 | Oshikoshi et al. | |
| 4,837,635 | 6/1989 | Santos | 358/451 |
| 4,870,500 | 9/1989 | Nagashima | 358/443 |
| 4,899,227 | 2/1990 | Yamada | 358/451 |
| 4,926,251 | 5/1990 | Sekizawa | 358/80 |
| 4,985,778 | 1/1991 | Ayata | 358/296 |

FOREIGN PATENT DOCUMENTS

| | | |
|---|---|---|
| 1-194680 | 8/1978 | Japan . |
| 59-163970 | 9/1984 | Japan . |
| 2103543 | 6/1982 | United Kingdom . |

Primary Examiner—Benjamin R. Fuller
Assistant Examiner—Scott A. Rogers
Attorney, Agent, or Firm—Frishauf, Holtz, Goodman & Woodward

[57] ABSTRACT

An electrophotographic copying apparatus, which is able to classify an image in a copy area of the original. The electrophotographic copying apparatus estimates a copy area of an original within a scan area based on copy condition data set and stored through an operation unit. A sampler samples the scanned image data in the copy area to form image data. An identifying unit uses the image data thus obtained to identify an image classification of the copy area from a group of image patterns.

7 Claims, 4 Drawing Sheets

COPIER WITH IMAGE TRANSFER REGION DETERMINATION AND SELECTIVE SAMPLING OF IMAGE DATA THEREOF

BACKGROUND OF THE INVENTION

The present invention relates to a copier which judges the kind of document image, such as a color image, a white and black image, a character image/a photographic image and density, according to the image data outputted from a scanner, and its which processes the image data according to the results of the judgement.

In a conventional copier, the following image processing method has been proposed: a document image is pre-scanned before transfer; sampling is conducted on the image data outputted from the scanner; the kind of document image, such as a color image/a white and black image, a character image/a photographic image and density, is judged according to the image data obtained by the sampling; and its image processing is conducted in accordance with the results of the judgement.

The density histogram illustrated in FIG. 5 is made from the sampled image data.

In the density histogram described above, two peaks usually appear at the position of the average density in the background and at the position of the average density of the letter portion. These two peaks are clear in the case of a document of character images. However, they are not clear in the case of a document of photographic images. Consequently, whether the image is a character one or a photographic one can be judged according to the shape of the density histogram.

The position of the peak in the density histogram corresponds to the density of the document, so that the density of the document can be judged according to the position of the peak in the density histogram.

In Japanese Patent Publication Open to Public Inspection No. 194680/1989, a method to set up a threshold value is disclosed which is characterized in that: the kind of an image is judged by making a density histogram in the manner described above; and the image data is quantized according to the judgment results.

For another example, the sampled data of red, green and blue is converted into values of the L*,a*,b* color specification system; when the values are in the chromatic region set up in the L*,a*,b* color specification system as illustrated in FIG. 6, color codes are generated; when the number of the color codes is not less than the threshold value, the document image is judged to be a color image; and when the number of the color codes is smaller than the threshold value, the document image is judged to be a white and black image. The color codes are generated, for example, by a ROM table illustrated in FIG. 7.

In the manner explained above, the development time of white and black images can be reduced by judging whether the document image is a color one or a white and black one. This method is disclosed in Japanese Patent Publication Open to Public Inspection No. 163970/1984.

As explained above, the sampling region of the image data by which the kind of an image is judged is conventionally fixed to all the region of a platen (for example, the region of A3 paper size) or fixed to a portion thereof (for example, the region of B6 paper size).

The document region to be transferred onto a transfer paper differs according to the size of the transfer paper and the magnification of transfer. For example, even when the size of a document is the same as that of a transfer paper, only a portion of the document is transferred on the transfer paper when magnified transfer is performed.

In other words, in the case of the conventional method in which the sampling region of the image data by which to judge the kind of an image is fixed, there is a fear of misjudgment because in some cases the image data of a document region which is not transferred onto a transfer paper is used for judgment.

It is a primary object of the present invention to provide a copier in which the image to be copied ca be properly judged.

SUMMARY OF THE INVENTION

The copier of the present invention comprises: a transfer region detecting means by which document image information in a transfer region is obtained; a data sampling means which conducts sampling of image data outputted from a scanner according to the information sent from the transfer region detecting means only while the scanner scans the transfer region; and an image judging means which judges the image according to the image data which has been sampled by the data sampling means.

By the transfer region detecting means described above, the information about the size of a transfer paper, the transfer magnification and the position of a document is computed, so that the information about the transfer region of the document which will be actually transferred onto a transfer paper can be obtained.

The image data outputted by the scanner is sampled in the transfer region so that the image can be judged. Accordingly, the image data of the document region which is not actually transferred onto a transfer paper is not used for judgment, so that the document image can be correctly judged

DETAILED DESCRIPTION OF THE PREFERRED EMBODIMENTS

Figure 1:
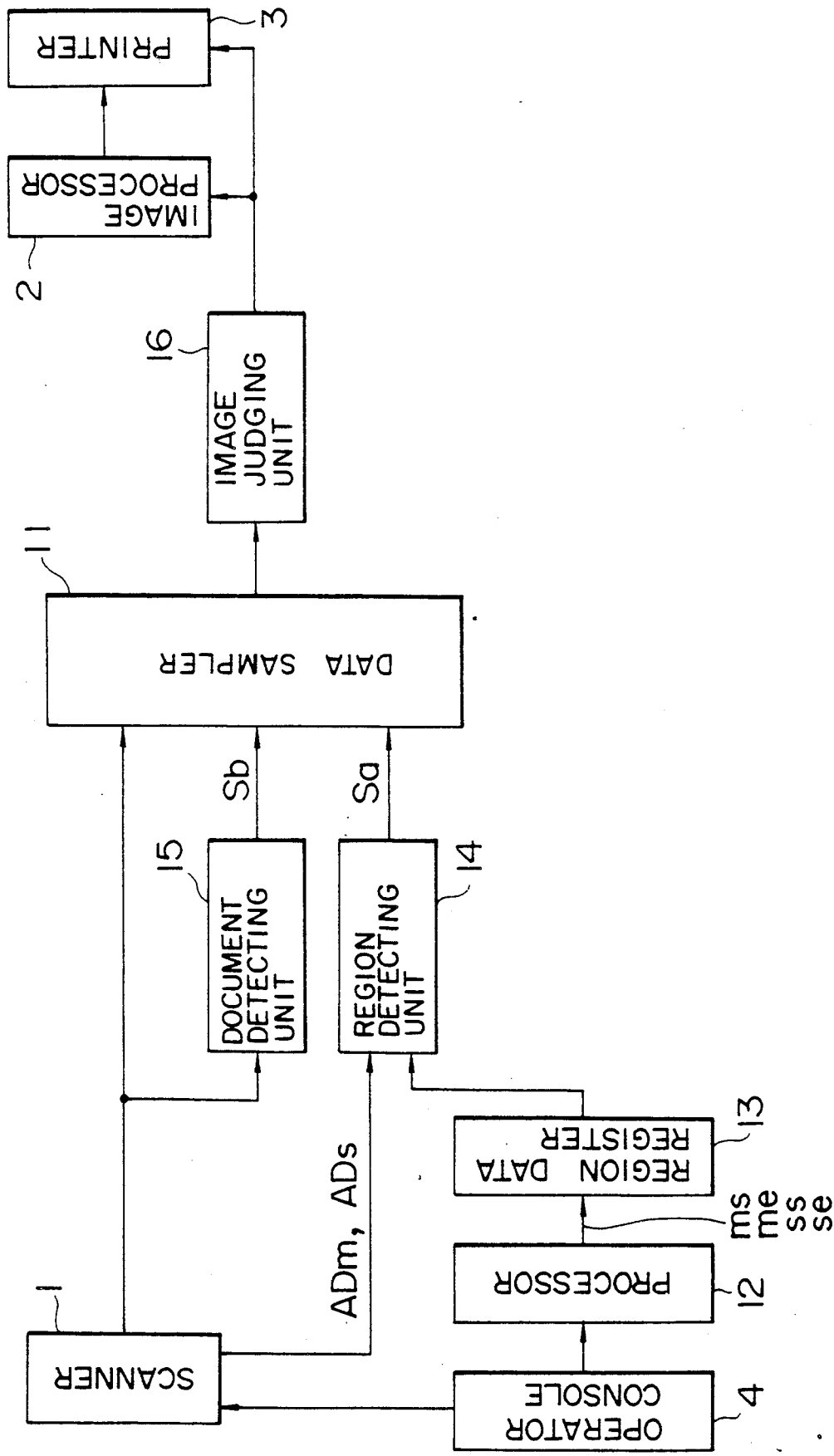
FIG. 1 is a block diagram showing an example of the present invention.

Referring now to the drawings, an example of the present invention will be explained as follows.

Figure 4:
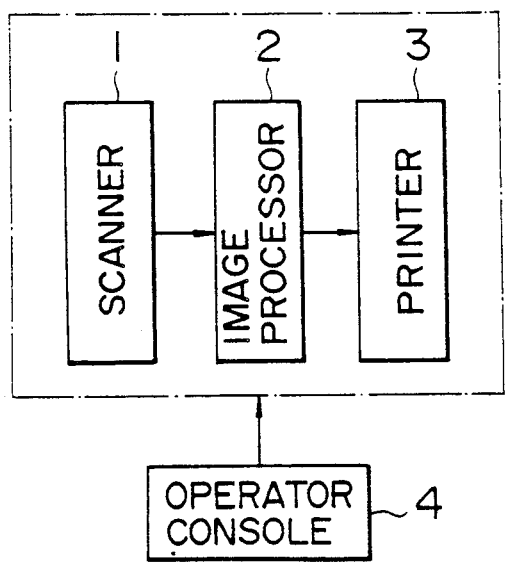
FIG. 4 is a block diagram showing the outline of the composition of the copier of the invention.
Figure 5:
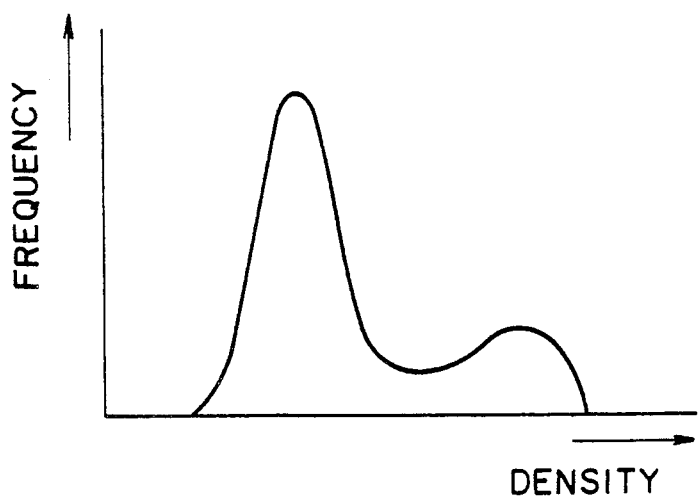
FIG. 5 to FIG. 7 are illustrations of a conventional example.
Figure 6:
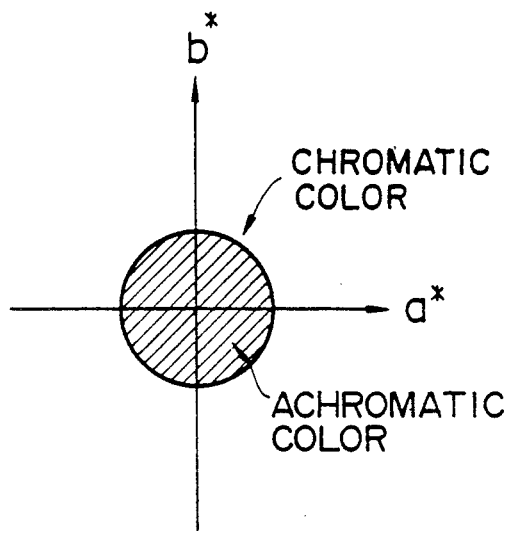
Figure 7:
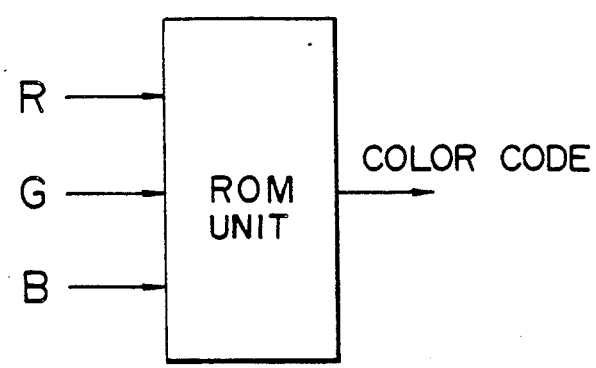

FIG. 4 is a block diagram showing the outline of the composition of the copier of the present invention. The image data outputted by the scanner 1 is processed by the image processor 2 and supplied to the printer 3 so that the document image can be transferred onto a transfer paper. The scanner 1, image processor 2 and printer 3 are controlled based on operating conditions which are preset using the operation unit or operator console 4.

FIG. 1 is a block diagram showing an example of the present invention in greater detail. In this example, the size of a transfer paper and the transfer magnification are set at the operation unit (operator console) 4.

In the apparatus illustrated in FIG. 1, after the size of a transfer paper and the transfer magnification have been set at the operation unit 4 and the start of transfer has been commanded, the document placed on a platen not illustrated in FIG. 1 is pre-scanned by the scanner 1.

The image data outputted by the scanner 1 is supplied to the data sampling unit 11.

The information about the size of a transfer paper and the transfer magnification is outputted from the operation unit 4 and is supplied to the processor or computation unit 12.

In the processor or computation unit 12, the transfer region (see FIG. 2) to be transferred onto a transfer paper, the range of which is ms to me in the direction of the horizontal scanning and ss to se in the direction of the vertical scanning, is computed according to the size of a transfer paper and the transfer magnification.

For example, assume that: the size of the platen is A3; the platen has the address of o to m in the horizontal scanning direction and o to n in the vertical scanning direction; the size of the transfer paper is A4; and the transfer magnification is 141%, wherein A3 size is 297 mm × 420 mm, and A4 size is 210 mm × 297 mm. In the case mentioned above, the values of ms, me, ss and se can be computed as follows: $ms = m/2 - 74\ m/297$; $me = m/2 + 74\ m/297$; $ss = 0$; and $se = n/2$. $74\ m/297 = 210/1.41 \times \frac{1}{2} \times m/297$; $n/2 = 297/1.41 \times n/420$ The data ms, me, ss and se computed by the processor or computation unit 12, are supplied to the region detecting unit 14 through the region data register 13. Address data ADm in the horizontal scanning direction which corresponds to the scanning position of the scanner 1, and address data ADs in the vertical scanning direction are supplied to the region detecting unit 14.

Figure 3:
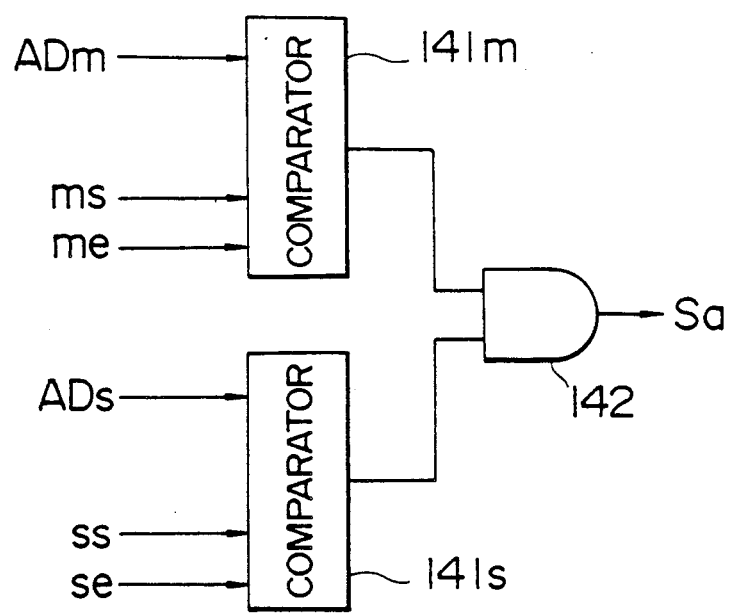
FIG. 3 is a block diagram showing the composition of the region detection unit.

FIG. 3 is a block diagram which shows an example of the composition of the region detecting unit 14.

Data ms, me and address data ADm are supplied to the comparator 141m. A signal is outputted from the comparator 141m at the timing of ms, for example, a signal of low level "0" is outputted at the timing of high level "1" and at the same time at the timing of data me.

Data ss, se and address data ADs are supplied to the comparator 141s. Address data ADs is outputted from the comparator 141s at the timing of data ss, for instance, a signal of low level "0" is outputted from the comparator 141s at the timing of high level "1" and at the same time at the timing of data se.

Figure 2:
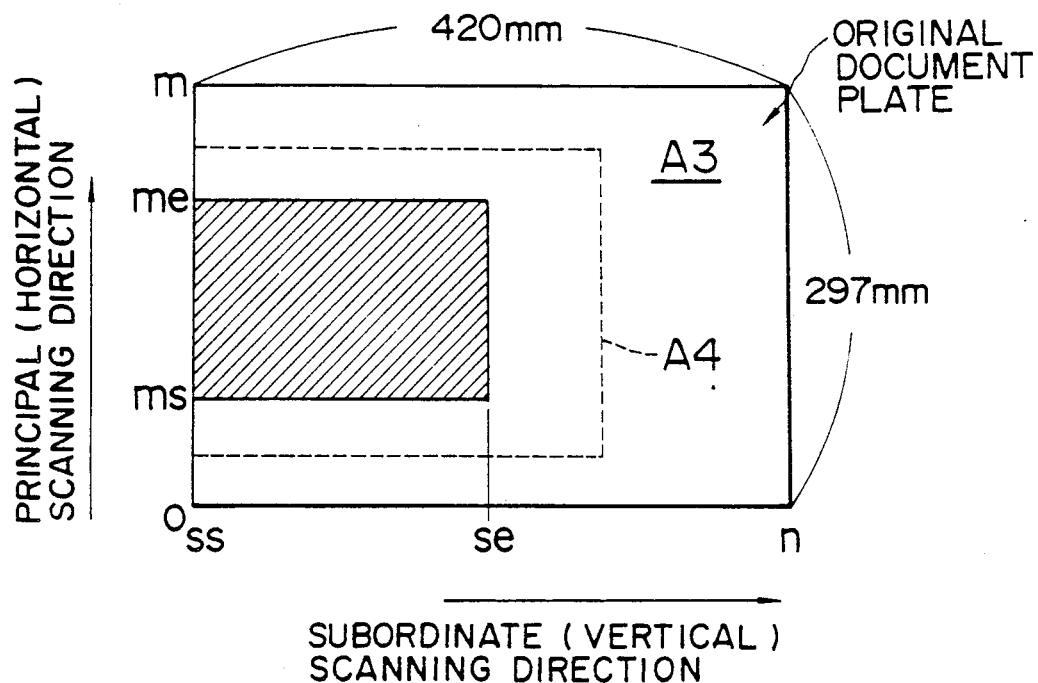
FIG. 2 is an illustration which explains the operation of region computation performed in the computation unit.

The output signals of the comparators 141m and 141s are supplied to AND circuit 142. Accordingly, region detection signal Sa, the level of which becomes high level "1" in accordance with the period in which the scanner 1 scans the region to be transferred which is illustrated by hatches in FIG. 2, is outputted from the AND circuit 142.

Referring now to FIG. 1, region detection signal Sa which is outputted from the region detecting unit 14, is supplied to the data sampling unit 11. The image data outputted from the scanner 1 is supplied to the document detecting unit 15. It is generally known that the level of image data outputted by a scanner becomes high when the scanner scans a document portion. The document detecting unit 15 detects the document portion utilizing the phenomenon described above. In other words, the image data is compared with a predetermined threshold value. When the level of the image data is higher than the threshold value, the document detector 15 judges that the image data is of the document portion, and a signal having a level of "1" is outputted. Accordingly, document detection signal Sb having a high level "1", is outputted from the document detecting unit 15 in accordance with the period in which the scanner 1 scans the document, and document detection signal Sb is supplied to the data sampling unit 11.

At the data sampling unit 11, the logical product of region detection signal Sa and document detection signal Sb is found (i.e. signal Sa is multiplied by signal Sb): and for example the signal of high level "1" is formed in accordance with the period in which the document portion is scanned. The image data sent from the scanner 1 is sampled only in the period when this signal becomes high level "1".

The image data sampled in the data sampling unit 11, is supplied to the image judging unit 16. As described above, in the image judging unit 16, a density histogram is made from the image data sampled in the manner described above so that whether the image is a character image or a photographic image is judged, and at the same time color codes are outputted and whether it is a color image or a white and black image is judged according to the number of the color codes. The image processing circuit 2 and printer 3 are controlled according to the judgment results obtained from the image judging unit 16.

In this case, the number of image data supplied to the image judging unit 16 is counted in order to change the data which needs to be revised in accordance with the number of image data such as a threshold value in judging whether it is a color image or a white and black image.

As explained above, according to this example, the image data outputted from the scanner 1 is scanned in the data sampling unit 11 only when the scanner 1 scans the document portion which will be actually transferred onto a transfer paper. The image data sampled in the way described above is supplied to the image judging unit 16 and the kind of image is judged only according to the image data.

Consequently, the image data of a document portion which is not actually transferred onto a transfer paper is not used for image data judgment, so that image judgment can be conducted more accurately than in the conventional method.

In the explanations described above, the present invention is applied to the example in which the size of a transfer paper and the magnification of transfer are set in the operation unit (operator console) 4. The present invention can be further applied to the book copying mode in which the center of a book is masked when the book is copied, and applied to a compiling mode in which a predetermined portion of a document is masked or trimmed.

In the case described above, the information of the book mode or the compiling mode is supplied to the computing unit or processor 12 from the operation unit 4 other than the information of the size of a transfer paper and the magnification of transfer. The region to be transferred is computed according to the supplied information. The computed data is supplied to the region detecting unit 14, and region detection signal Sa to which the information of the book mode or the compiling mode is added, is formed in the region detecting unit 14.

As explained above, according to the present invention, image judgment is conducted by sampling the image data which is outputted from an image scanner while the image scanner scans a document region which will be actually transferred onto a transfer paper, so that the image data of a document region which is not transferred onto a transfer paper, is not utilized for image data judgment. Accordingly, image judgment can be conducted more accurately than in the conventional apparatus.

What is claimed is:

1. An electrophotographic copying apparatus comprising:

setting means for setting a copy condition of the apparatus, the copy condition including size of a recording sheet and magnification in copying;

scanning means for scanning a scan area of a platen to obtain scanned image data, the scanned image data including image data of an image on an original sheet placed on the platen;

estimating means for estimating a copy area within the scan area based on the set size and the set magnification, the copy area being an area to be copied onto the recording sheet;

detecting means for detecting an original sheet area, the original sheet area being an area within the scan area occupied by the original sheet placed on the platen;

means for recognizing a common area between the copy area and the original sheet area;

means for selectively sampling only the scanned image data obtained by the scanning in the common area; and means for specifying an image type of the original based on the scanned image data sampled by the sampling means.

2. The apparatus of claim 1, wherein the detecting means detects the original sheet area based on a density level distribution of the scanned image data.

3. The apparatus of claim 1, wherein the copy condition setting means includes means for setting an editing mode to designate a masking area and a trimming area of the original sheet, and wherein the sampling means further rejects to sample the scanned image data obtained from the scanning in the masking area and the trimming area.

4. The apparatus of claim 3, wherein said means for setting the editing mode designates a masking area of a book to be copied.

5. The apparatus of claim 3, wherein said means for setting the editing mode designates a trimming area at sides of the original sheet.

6. The apparatus of claim 1, wherein the estimating means comprises means for calculating the copy area.

7. The apparatus of claim 1, further comprising means for storing the copy condition information.

* * * * *